United States Patent
Bollom et al.

(10) Patent No.: US 12,173,567 B2
(45) Date of Patent: *Dec. 24, 2024

(54) SEPARATOR SYSTEM AND METHOD

(71) Applicant: CP Energy Services, Inc., Wilmington, DE (US)

(72) Inventors: Troy Bollom, Oklahoma City, OK (US); Jon Paul Rountree, Oklahoma City, OK (US); Joe Don Selman, Oklahoma City, OK (US)

( * ) Notice: Subject to any disclaimer, the term of this patent is extended or adjusted under 35 U.S.C. 154(b) by 129 days.

This patent is subject to a terminal disclaimer.

(21) Appl. No.: 17/937,083

(22) Filed: Sep. 30, 2022

(65) Prior Publication Data
US 2023/0025841 A1   Jan. 26, 2023

Related U.S. Application Data

(63) Continuation of application No. 17/073,992, filed on Oct. 19, 2020, now Pat. No. 11,492,859, which is a
(Continued)

(51) Int. Cl.
| | |
|---|---|
| *E21B 21/06* | (2006.01) |
| *B01D 19/00* | (2006.01) |
| *B01D 21/00* | (2006.01) |
| *B01D 21/02* | (2006.01) |
| *B01D 45/16* | (2006.01) |
| *B01D 47/10* | (2006.01) |
| *B01D 50/40* | (2022.01) |

(Continued)

(52) U.S. Cl.
CPC ........ *E21B 21/065* (2013.01); *B01D 19/0068* (2013.01); *B01D 21/003* (2013.01); *B01D 21/10* (2013.01); *B01D 45/16* (2013.01); *B01D 47/10* (2013.01); *B01D 50/40* (2022.01); *B03B 9/02* (2013.01); *E21B 21/067* (2013.01); *B01D 2221/04* (2013.01); *B65G 33/24* (2013.01); *C10G 7/04* (2013.01)

(58) Field of Classification Search
None
See application file for complete search history.

(56) References Cited

U.S. PATENT DOCUMENTS

| | | |
|---|---|---|
| 2,331,102 A | 10/1943 | Bird et al. |
| 3,605,910 A | 9/1971 | Deeter et al. |

(Continued)

OTHER PUBLICATIONS

International Searching Authority, "International Search Report," issued in connection with PCT patent application No. PCT/US2021/071918, mailed on Feb. 23, 2022, 4 pages.

(Continued)

*Primary Examiner* — Youngsul Jeong
(74) *Attorney, Agent, or Firm* — Scheef & Stone, L.L.P.; Keith C. Rawlins, Esq.

(57) ABSTRACT

A separator system and method may provide a four-way separator that may separate a material and remove a hazardous material. The hazardous material may include gas and sand that may be removed by the four-way separator. The separator system and method may further provide a main unit that may include three chambers or recirculation hoppers, an auger sand extractor, and a strap tank. The separator system and method may provide a faster rig-up time and may be exclusively driven by hydraulics.

13 Claims, 4 Drawing Sheets

Related U.S. Application Data continuation-in-part of application No. 16/148,398, filed on Oct. 1, 2018, now Pat. No. 10,807,022.

(51) Int. Cl.
*B03B 9/02* (2006.01)
*B65G 33/24* (2006.01)
*C10G 7/04* (2006.01)

(56) References Cited

U.S. PATENT DOCUMENTS

| | | | |
|---|---|---|---|
| 4,287,761 A | | 9/1981 | Moffet et al. |
| 4,519,848 A | | 5/1985 | Underwood |
| 4,784,757 A | | 11/1988 | Nelson et al. |
| 5,236,605 A | | 8/1993 | Warncke |
| 5,242,604 A | | 9/1993 | Young et al. |
| 5,344,570 A | | 9/1994 | McLachlan et al. |
| 5,665,245 A | * | 9/1997 | Kloss .................... B01D 21/10 210/744 |
| 7,972,501 B2 | * | 7/2011 | Godlien ............... B01D 21/262 210/207 |
| 8,449,779 B2 | | 5/2013 | Thompson |
| 8,517,167 B2 | | 8/2013 | Thompson |
| 9,498,739 B2 | | 11/2016 | Thompson |
| 9,597,614 B2 | | 3/2017 | Thompson |
| 9,687,761 B2 | | 6/2017 | Thompson |
| 10,807,022 B2 | * | 10/2020 | Bollom .............. B01D 21/2461 |
| 11,492,859 B2 | * | 11/2022 | Bollom .................. B01D 47/10 |
| 2008/0006304 A1 | | 1/2008 | Treherne et al. |
| 2009/0236144 A1 | | 9/2009 | Todd et al. |
| 2009/0277632 A1 | * | 11/2009 | Frazier .................. E21B 21/066 166/267 |
| 2012/0211281 A1 | | 8/2012 | King |
| 2012/0216416 A1 | | 8/2012 | Hollier et al. |
| 2012/0325751 A1 | | 12/2012 | Renick et al. |
| 2013/0284023 A1 | | 10/2013 | Ratto et al. |
| 2013/0284026 A1 | | 10/2013 | Warncke |
| 2015/0047906 A1 | * | 2/2015 | Serda, Jr. ................ E21B 21/06 175/57 |
| 2018/0193773 A1 | | 7/2018 | Thompson |
| 2019/0211501 A1 | | 7/2019 | Meddoff |
| 2020/0101403 A1 | | 4/2020 | Bollom et al. |

OTHER PUBLICATIONS

International Searching Authority, "Written Opinion," issued in connection with PCT patent application No. PCT/US2021/071918, mailed on Feb. 23, 2022, 4 pages.

\* cited by examiner

SEPARATOR SYSTEM AND METHOD

CROSS-REFERENCE TO RELATED APPLICATION

The present Application is a continuation of U.S. patent application Ser. No. 17/073,992, filed Oct. 19, 2020, which is a continuation-in-part of U.S. patent application Ser. No. 16/148,398, filed Oct. 1, 2018, which are incorporated by reference in its entirety.

TECHNICAL FIELD

The disclosure relates generally to a separator system and method, and more specifically, to a separator system and method for removing hazardous materials, including eliminating harmful gases and sand.

BACKGROUND

Separators may remove sand, gas, and other hazardous materials during a drill out process but may not eliminate all hazardous materials. Conventional separators can provide significantly long rig-up times that exceed two hours and can require third-party trucking and additional personnel. Further, conventional separators can require permits and cannot be hauled at any time. Electronic systems can fail separator systems and can even cause explosions.

SUMMARY

Embodiments of the present disclosure may provide a separator system and method that may include a main unit. The main unit may provide a plurality of chambers that may be arranged to separate a material that may include a hazardous material, and the hazardous material may be removed from the separator system. The separator system and method may provide a tank that may be partitioned within the main unit. The separator system and method may further provide a vertical circulation separator that may be connected to the main unit. A scrubber may be arranged between the vertical circulation separator and a flare system. The separator system may be a four-way separator and may provide an auger hopper that may be arranged to receive the hazardous material. The plurality of chambers may be provided to trap a residual material that may escape the auger hopper. The flare system may receive gas from the scrubber and may provide one or more roll-off boxes that may be stored under an auger to capture the hazardous material. The separator system and method may provide a diesel engine including at least one hydraulic pump, wherein the diesel engine may power a recirculation pump, a transfer pump, and the auger. The scrubber may be arranged between the flare system and the main unit.

Other embodiments of the present disclosure may provide a four-way separator that may include a main unit including three chambers arranged to remove harmful gas and sand from a hazardous material. The four-way separator may provide a tank that may be partitioned within the main unit, a vertical circulation separator that may be connected to the main unit, and a scrubber that may be arranged between the vertical circulation separator and a flare system. The four-way separator may completely eliminate sand from the hazardous material. The tank may measure an amount of a return fluid and may transfer the return fluid to another tank, a pit, or a fracturing tank. The tank may provide a sight glass that may measure the return fluid and may view the return fluid inside of the tank. The four-way separator may provide an auger hopper that may be arranged to receive the hazardous material, and the three chambers may trap a residual material that may escape the auger hopper. The main unit may prevent the hazardous material from clogging the four-way separator through continuous circulation. The four-way separator may further reduce a rig-up time.

Embodiments of the present disclosure may provide a method of separating a material in a separator system that may include sending the material to a vertical circulation separator. The material may include a hazardous material, and the hazardous material may include a gas and a wellborn fluid. The method may further include the step of continuously circulating the material to prevent the separator system from clogging. The method may also include the step of constantly moving the material by utilizing a water jet system to keep the material including a particulate matter in motion. The method may include creating a Venturi effect that may pull a fluid and a sand out of the material and into the separator system. The method may include feeding the gas to a scrubber and a flare system and trapping a residual sand that escapes an auger hopper into a plurality of chambers. The plurality of chambers may provide three chambers. The method may include capturing the residual sand that may be removed from the auger hopper into roll-off boxes stored underneath the auger hopper.

Other technical features may be readily apparent to one skilled in the art from the following drawings, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Embodiments of the present disclosure may generally provide a separator system and method that may separate hazardous material and eliminate harmful gases and sand.

Figure 1:
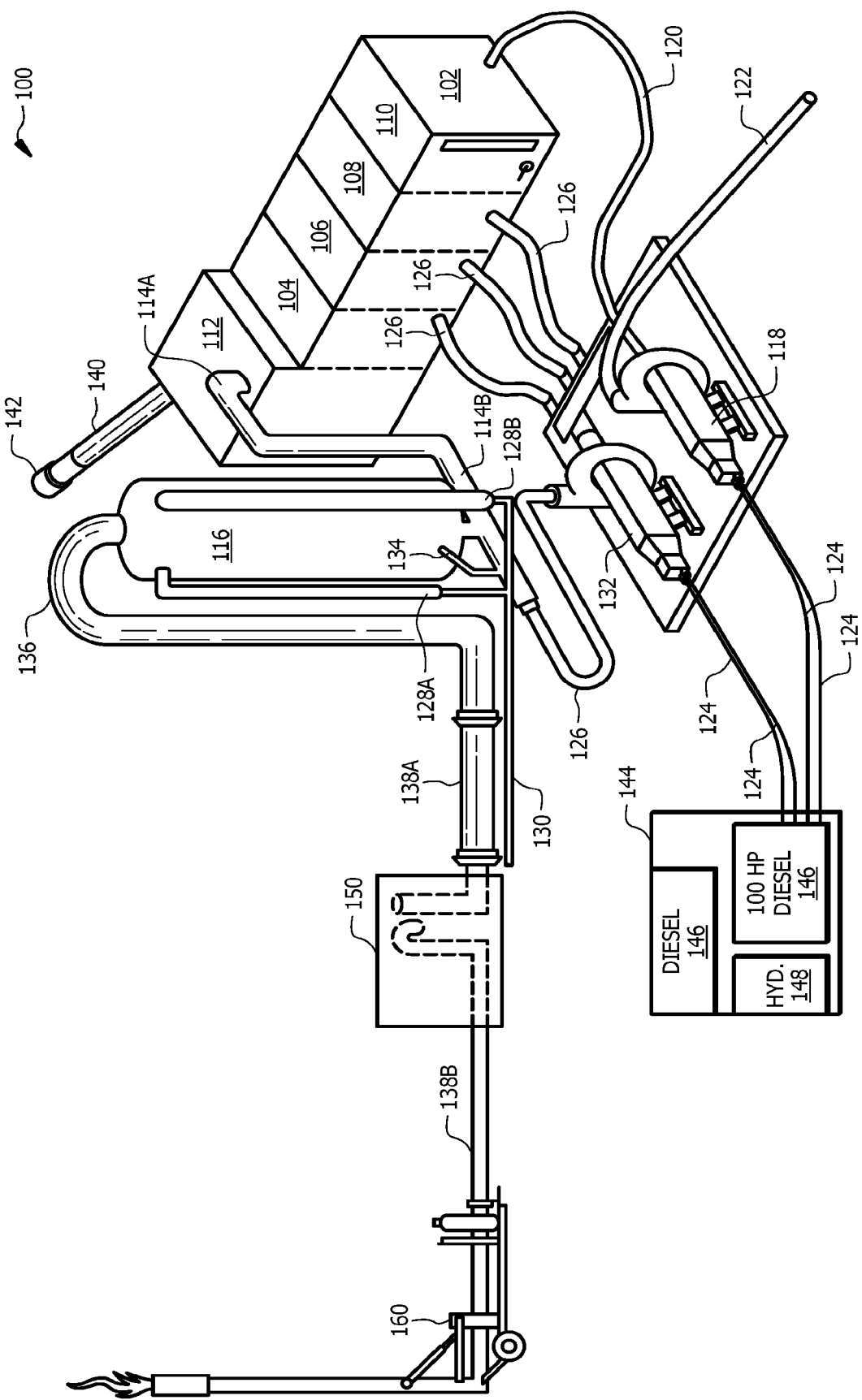
FIG. 1 is a view of a separator system according to an embodiment of the present disclosure.

FIG. 1 depicts separator system 100 according to an embodiment of the present disclosure. Separator system 100 may provide main unit 102 that may be a separation unit and may include one or more chambers, which may be a plurality of chambers 104, 1.06, 108. Main unit 102 may further include tank or strap tank 110, and auger hopper or auger sand extractor 112. Chambers 104, 106, 108 may be three recirculation hoppers that may trap one or more materials, such as residual sand, that may have escaped from auger hopper or auger sand extractor 112. It should be appreciated that main unit 102 may be a four-way separator in an embodiment of the present disclosure. It should be appreciated that material, such as sand, may pass across auger hopper 112 a plurality of times. It should be appreciated that the one or more materials may include, but are not limited to, sand, residual sand, gas, and/or fluid.

Tank 110 may be a strap tank that may provide a final partitioned area of main unit 102. Tank 110 may be utilized to obtain a desired coefficient of material or the rate of returns on fluid. The coefficient of material may compare an amount of barrel fluid returned to an amount of fluid sent downhole and may provide the amount of fluid per barrel that tank 110 can hold within a certain space. It should be appreciated that an ideal coefficient of material may provide one barrel into tank 110 and one barrel out of tank 110. It should also be appreciated that the rate of return may be measured by pulling a strap or measuring stick out of the barrel. The change in depth or the amount of fluid may be measured over a five-minute duration and may be multiplied by the coefficient of the tank to calculate the amount of barrels (bbls). It should be appreciated that the amount of bbls may be calculated in bbls per inch. The amount of bbls may be divided by the five-minute duration. It should be appreciated that the depth or the amount of fluid may be measured over time periods other than five minutes, and the amount of bbls may be divided by the respective time period to calculate the rate of return. It should be appreciated that one inch of fluid may be equivalent to one bbl. For example, if 18 inches of fluid are measured over a 5-minute time period, the rate of return would be calculated as (18*1)/5=3.6 bbls return per minute. It should be appreciated that sight glass may be installed on a side of tank 110 and may provide measurement markings for measuring the material. Return fluid from the material may only reach tank 110 when the material is added to separator system 100. It should also be appreciated that once main unit 102 reaches capacity, any return fluid added to separation system 100 may be present and visible in tank 110 through the sight glass. After return fluid is sent to tank 110, the return fluid may be transferred to another tank or a fracturing pit. Transfer pump 118 may remove fluids through transfer line 120 into discharge line 114B. Hydraulic lines 124 may be connected to recirculation line 126, transfer line 120, and auger line 122. It should be appreciated that recirculation line 126, transfer line 120, and auger line 122 may be controlled by hydraulic and/or motor speed in embodiments of the present disclosure.

Vertical circulation separator or gas buster 116 may provide side jets (not shown) and a Venturi system (not shown). Gases and well-born fluid may be sent into vertical circulation separator 116 which may be designed to route return material into the top of vertical circulation separator 116 to break up the return material over internal baffles provided in one or more chambers 104, 106, 108. Vertical circulation separator 116 may prevent clogging of separator system 100 and may be used to extract solids. It should be appreciated that vertical circulation separator 116 may stand alongside a pole truck, crane, or additional support vehicle without requiring external support or tiedowns. One or more lines 128A, 128B may be provided in vertical circulation separator 116 and may return materials from flowback portion 130 into separator system 100. It should be appreciated that one or more lines 128A, 128B may be capped without departing from the present disclosure. It should also be appreciated that one or more lines 128A, 128B may provide exactly two lines in vertical circulation separator 116 in an embodiment of the present disclosure. It should further be appreciated that one or more lines 128A, 128B may be intake lines. An alternate buster may be placed on auger hopper 112 and may be utilized to bypass vertical circulation separator 116, if desired by the user.

Discharge tube 114A and discharge line 114B may discharge material, such as sand. Discharge line 114B may be connected to the bottom of vertical circulation separator 116 and may receive fluid from recirculation pump 132 that may be received from recirculation line 126. Material may be sent through separator line 134 and may create a constant rotation of fluid in the bottom of vertical circulation separator 116 that may prevent settling of material. Remaining material may be sent across the bottom of discharge line 114B and may create a Venturi effect that may pull fluid from vertical circulation separator 116 and discharge all fluids combined into auger hopper 112 through discharge tube 114A. Return fluid may be sent from flowback 130 through one or more lines 128A, 128B. Return fluid may be sent over internal baffles from the top of vertical circulation separator 116. In an embodiment of the present disclosure, there may be three internal baffles. Gases may be sent up through vertical circulation separator 116 and out of flare discharge 136. Gases may then be sent downstream through at least one flare line 138A, 138B, and condensation may be sent out of flare discharge 136 and burned of.

Material, such as fluids, may be returned or further passed through separation system 100 during recirculation. Material, such as sand, may settle into auger 140 and may then be discharged through auger 140. It should be appreciated that sand may settle into the bottom of auger 140. Material, such as sand that may be suspended in fluid, may overflow into one or more chambers 104, 106, 108. It should be appreciated that one or more chambers 104, 106, 108 may have hoppers (not shown) that may be provided at the bottom of one or more chambers 104, 106, 108. It should also be appreciated that baffles may be provided between one or more chambers 104, 106, 108. These baffles may allow sand to settle, accumulate, and recirculate back through return lines 126 to the bottom of vertical circulation separator 116, through discharge line 114B, and through discharge tube 114A. Separator system 100 may provide multiple opportunities for material to settle and travel through auger 140. Auger 140 may spin at approximately eight rotations per minute (rpm) to remove sand and may allow water to flow downward to keep the sand removed as dry as possible; however, the rotation speed may vary without departing from the present disclosure. Auger motor 142 may provide a speed that may be controlled by a piston (not shown) that may be driven by a hydraulic pump (not shown) that may prevent heat from building up. It should be appreciated that auger motor 142 may eliminate loss of torque and overload issues that may be common or specific to electric speed controllers. Hydraulic pumps may provide recirculation and transfer pumps that may be hydraulic-driven. It should be appreciated that hydraulic pumps may provide a transfer rate that may be adjustable in embodiments of the present disclosure.

Power pack 144 may provide diesel engine 146 and/or hydraulic pumps 148. Diesel engine 146 may provide 100 horsepower (hp) that may power hydraulic pumps 148. It should be appreciated that separator system 100 may be exclusively driven by hydraulics in embodiments of the present disclosure. It should also be appreciated that electronics may not be included, which may reduce and/or even eliminate risk of failure and/or explosion.

Separator system 100 may provide scrubber 150 that may receive gases from lines and send them to flare system 160. Scrubber 150 may be a scrubber box or an environmental scrubber that may remove condensate that may be sent through flare system 160 and vertical gas buster 116. Scrubber 150 may transfer fluids back to main unit 102 and may be installed between flare system 160 and vertical circulation separator 116. Scrubber may be located approximately one hundred feet from main unit 102 and approximately fifty feet from flare system 160 in an embodiment of the present disclosure. Flare system 160 may include flare lines (not shown). It should be appreciated that flare lines may have a length of up to approximately 300 feet. It should also be appreciated that a hammer union line (not shown) of approximately 200-300 feet may be provided in flare system 160 depending upon separator system 100 location and site requirements. It should be appreciated that a discharge line (not shown) may be installed to discharge fluids that may be captured to a pit or another location. It should be appreciated that flare system 160 may be a trailered flare system that may provide flare control and hydraulic lift which may raise and/or lower flare system 160. It should be appreciated that flare system 160 may be propane-assisted in an embodiment of the present disclosure.

A method of separating hazardous material in separator system 100 according to an embodiment of the present disclosure ay include sending gas and/or well-born fluid to vertical circulation separator or gas buster 116. The method may provide sending return material from flowback into a vessel and breaking up the material over internal baffles. In an embodiment of the present disclosure, there may be three internal baffles. The method may further provide continuously circulating the material and preventing separator system 100 from clogging up with sand. The method may also provide constantly moving fluid and particulate matter by utilizing a water jet system to keep fluid and particulate matter in motion. The method may provide separating gas and fluid and creating a Venturi effect to pull fluid and sand out of a vessel and into separator system 100. The method may provide feeding gas to scrubber 150 and flare system 160. The method may provide funneling sand and/or particulate matter into auger hopper 112. The method may further provide carrying the sand and/or particulate matter into roll-off boxes. The method may provide trapping residual sand that escapes auger hopper 112 into three chambers 104, 106, 108. The method may provide recapturing settlement in specialized hoppers and sending the settlement back through auger hopper 112. The method may provide circulating settlement until auger hopper 112 removes all particulate matter. The method may also provide measuring return material and may include a strapping process for accurately pulling straps via external tank 110. The method may provide continuously running circulation pumps during the strapping process and turning a transfer pump off. The method may provide transferring surface fluids to a pit or frac tanks. The method may provide capturing sand removed from auger hopper 112 in roll-off boxes that may be stored under auger hopper 112.

Separator system 100 may eliminate a need for load permits and may allow for hauling loads anytime. Separator system 100 may not exceed weight and height requirements so as to require permits. Separator system 100 may be movable and may provide components that may be movable anytime. It should be appreciated that separator system 100 may provide a rig-up time that may be faster than other systems and more efficient. It should be appreciated that rig-up time may be approximately 2 hours or less. It should also be appreciated that separator system 100 may be small in size and may not require large trucks for support. It should further be appreciated that separator system 100 may eliminate sand in all compartments and may provide faster clean out times. Separator system 100 may run without requiring additional personnel or support.

Figure 2A:
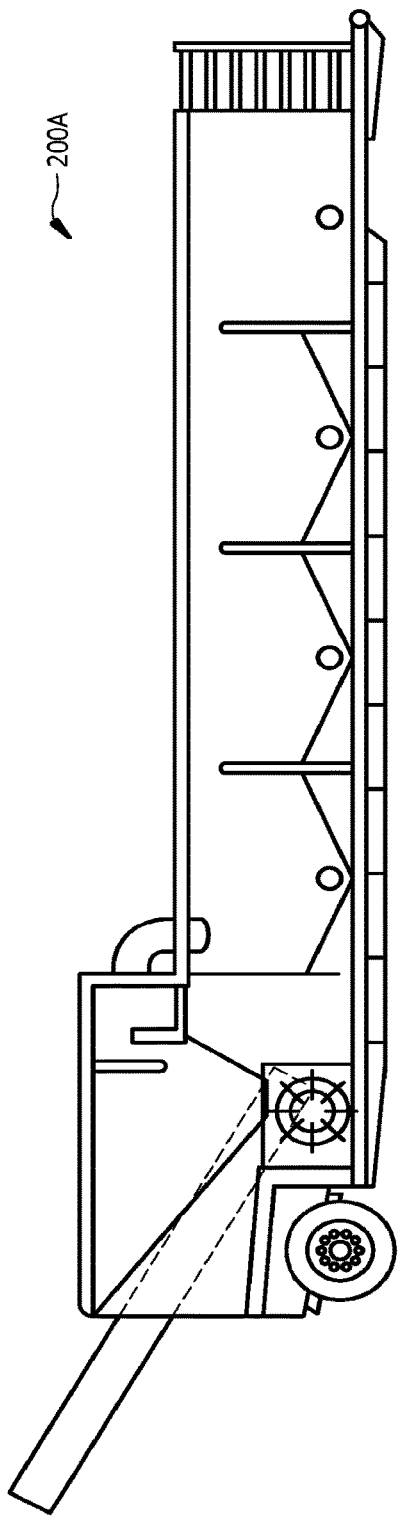
FIG. 2A is a view of a separator system according to an embodiment of the present disclosure.
Figure 2B:
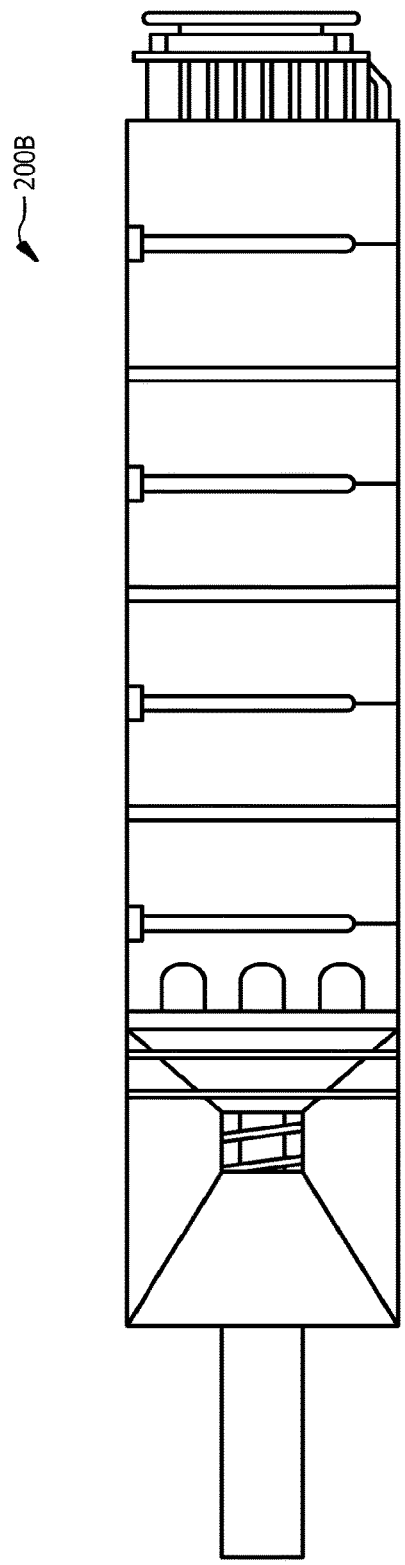
FIG. 2B is a view of a separator system according to an embodiment of the present disclosure.
Figure 2C:
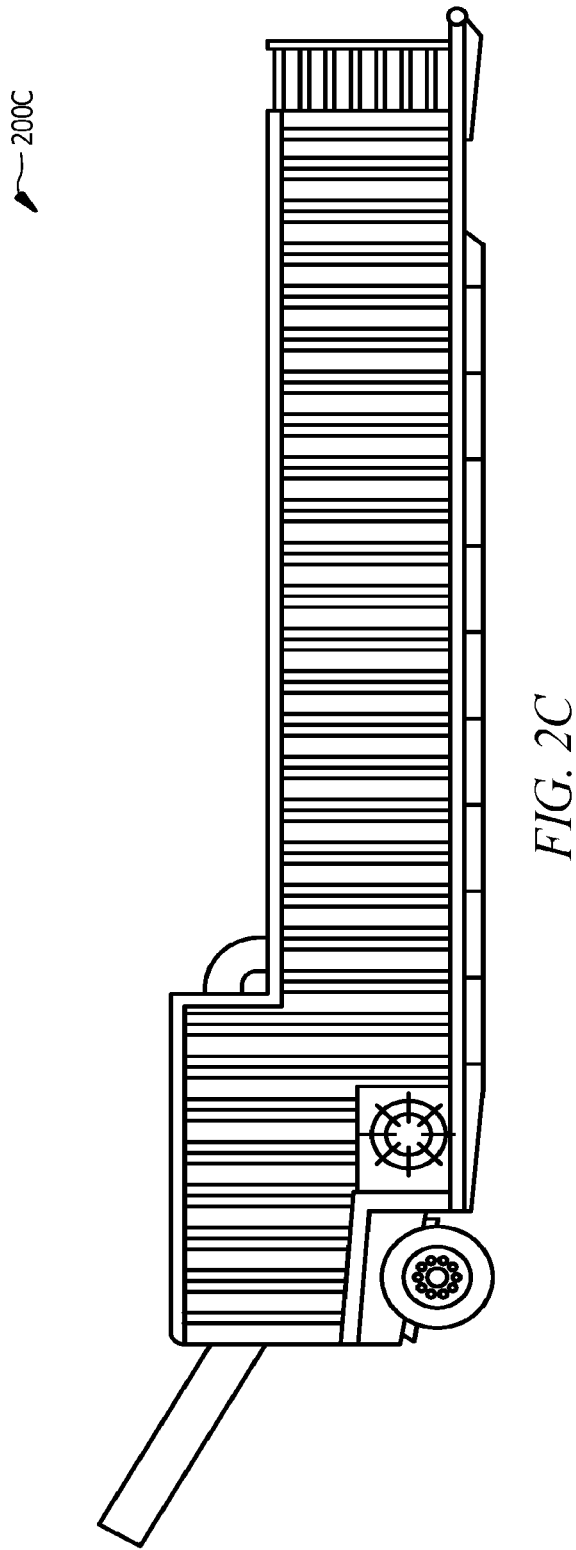
FIG. 2C is a view of a separator system according to an embodiment of the present disclosure.
Figure 3:
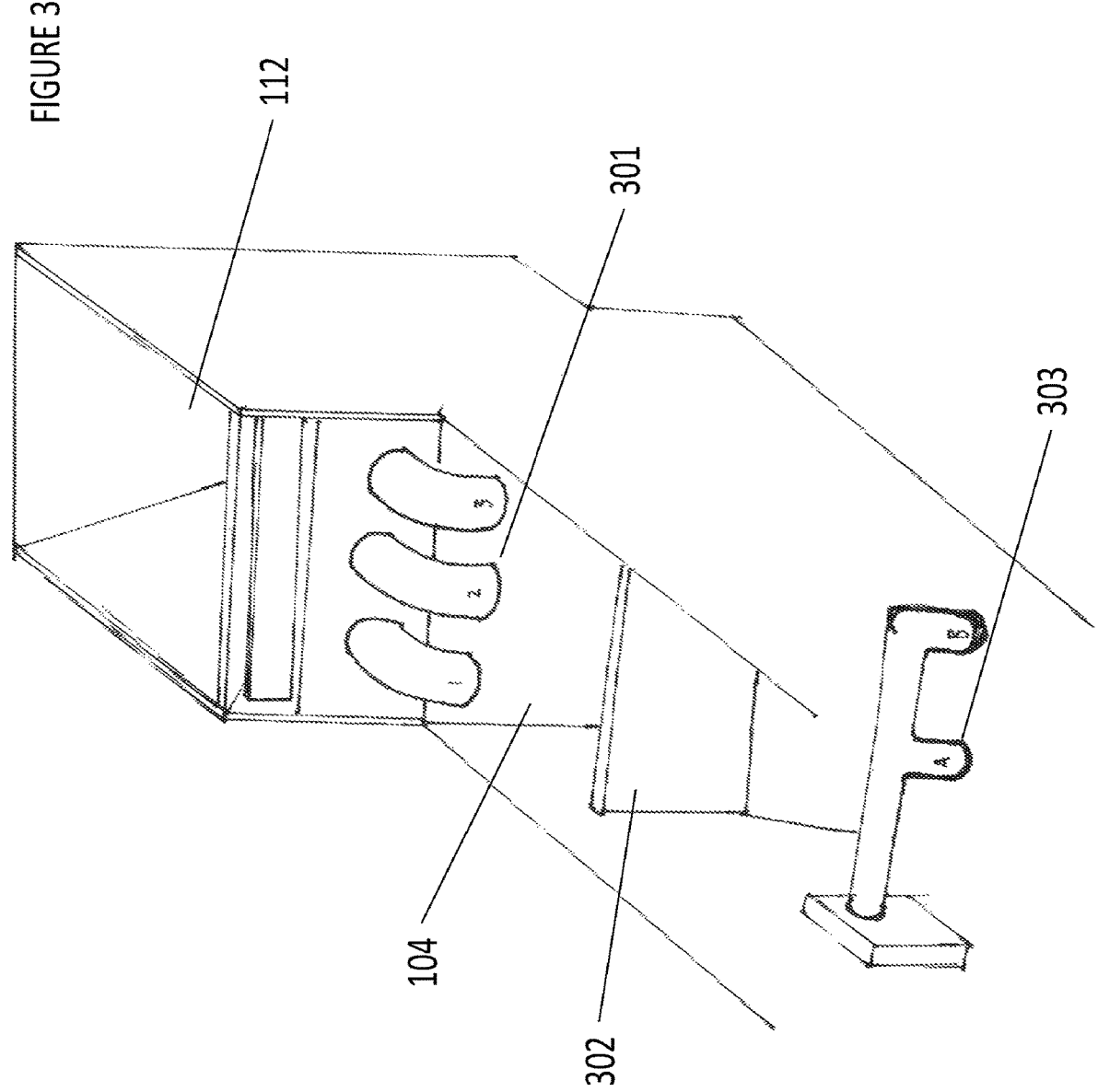
FIG. 3 depicts a cut-away view of a portion of a separator system according to an embodiment of the present disclosure.

FIGS. 2A-2C depict separator system 200A, 200B, 200C according to embodiments of the present disclosure. Separator system 200A, 200B, 200C may provide a four-way separator that may separate a hazardous material during a drill out process and reduce a rig-up time. It should be appreciated that separator system 200A, 200B, 200C may remove approximately 99% of harmful gas and approximately 95% of sand from hazardous material in an embodiment of the present disclosure. It should also be appreciated that separator system 200A, 200B, 200C may reduce or even eliminate all harmful gas and sand so that no gas may be detected in the hazardous material without departing from the present disclosure, FIG. 3 depicts a cut-away view of a portion of a separator system according to an embodiment of the present disclosure. Three tubes 301 may be placed between auger hopper 112 and the first of three recirculation bins or chambers 104. Tubes 301 are each formed at a 90-degree downward angle. Water may flow over a weir plate or other similar barrier over which water flows. This may force any floating particulate matter to be submerged. Water then goes into a collection box where water may be forced down one of three tubes 301. This may allow a better downward force of the fluid from auger hopper 112 to first recirculation bin or chamber 104. This downward force also may help sand within first recirculation bin or chamber 104 to be forced downward toward a first of two recirculation pick-up points as opposed to merely providing a waterfall cascade effect.

Perforated wall 302 (which also may be referred to as an internal baffle) may be provided between first recirculation bin or chamber 104 and the second recirculation bin or chamber. Inclusion of perforated wall 302 may allow for a more fluid movement for sand and water to flow as opposed to sand and water having to travel back up and over a wall to reach the second recirculation bin or chamber. Material may flow over forcing water down to the suction port as discussed further below. Perforated wall 302 also may allow for drop out of sand in embodiments of the present disclosure.

Each of the plurality of recirculation bins or chambers (104, 106, 108) may include internal angles sides and a suction port positioned at a crux of the internal angled sides that provide for continuous circulation. Further, each of the plurality of recirculation bins or chambers (104, 106, 108) may be concave in shape and include two strategically placed suction pick-up points 303 on each of the suction ports for fluid and sand to be sent back across auger hopper 112. Accordingly, the separator system may include six suction points inside recirculation bins or chambers (104, 106, 108) to allow for recirculation and self-cleaning in embodiments of the present disclosure. This fluid circulation also may be beneficial in creating fluid movement across the bottom of the vertical circulation separator thereby providing a true venturi effect and preventing the vertical circulation separator from clogging.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A separator system comprising:
 a main unit comprising:
  a plurality of recirculation chambers arranged to separate a portion of a material including water and sand, each of the plurality of recirculation chambers having internal angled sides and a suction port through which the sand is continuously circulated to a vertical circulation separator;
  at least one internal baffle provided between one or more of the plurality of recirculation chambers over which the material flows forcing sand down to the suction port in each of the plurality of recirculation chambers;
  a tank within the main unit formed by a partition; and
 a hopper arranged to receive the material from the vertical circulation separator, wherein the plurality of recirculation chambers trap the portion of the material that escapes the hopper.

2. The separator system of claim 1, further comprising an auger attached to the hopper, the auger having a hydraulically driven auger motor that provides a controllable speed.

3. The separator system of claim 1, further comprising:
 the vertical circulation separator connected to the main unit;
 a scrubber connected to the vertical circulation separator configured to receive a residual gas from the vertical circulation separator; and
 a flare system configured to receives a treated gas from the scrubber.

4. The separator system of claim 1, wherein the plurality of recirculation chambers comprises three recirculation chambers.

5. The separator system of claim 1, wherein the sand is completely eliminated from the water.

6. The separator system of claim 1, wherein the tank is used to measure an amount of a return fluid comprising a portion of the water and transfer the return fluid to another tank, a pit, or a fracturing tank.

7. The separator system of claim 6, wherein the tank has a sight glass for measuring the return fluid and viewing the return fluid inside of the tank.

8. The separator system of claim 1, wherein the main unit prevents the material from clogging through continuous circulation.

9. The separator system of claim 1, having a rig-up time of 2 hours or less.

10. A method of separating a material in a separator system, comprising:
 receiving a material comprising a hazardous material, water, and sand into a hopper;
 trapping a portion of the material that escapes the hopper in a plurality of recirculation chambers, each of the plurality of recirculation chambers having internal angled sides and a suction port positioned at a crux of the internal angled sides; and
 continuously recirculating a residual sand from the suction port to a vertical circulation separator and then to the hopper.

11. The method of claim 10, further comprising:
 sending a well-born fluid to the vertical circulation separator;
 separating the well-born fluid into a gas and the material;
 creating a Venturi effect to flow the material out of the vertical circulation separator; and
 feeding the material to the hopper.

12. The method of claim 11, further comprising:
 feeding the separated gas from the vertical circulation separator to a scrubber to produce a treated gas; and
 feeding the treated gas to a flare system.

13. The method of claim 10, wherein the plurality of recirculation chambers comprises three chambers.

* * * * *